United States Patent [19]
Hattori et al.

[11] Patent Number: 4,685,051
[45] Date of Patent: Aug. 4, 1987

[54] REVOLUTION SIGNAL PROCESSING SYSTEM FOR VEHICULAR ELECTRONIC CONTROLLER

[75] Inventors: Toshihiro Hattori, Ayase; Katsuya Shishido, Fujisawa; Hitoshi Kasai, Kawasaki; Shigeki Moride, Yokosuka; Noriaki Ogawa, Tokyo, all of Japan

[73] Assignees: Isuzu Motors Limited, Tokyo; Fujitsu Limited, Kawasaki, both of Japan

[21] Appl. No.: 686,523

[22] Filed: Dec. 26, 1984

[51] Int. Cl.⁴ .............................................. B60K 41/08
[52] U.S. Cl. .................................. 364/424.1; 74/866
[58] Field of Search .......... 364/424.1, 431.03, 431.05; 73/118, 162; 74/866

[56] References Cited
U.S. PATENT DOCUMENTS 3,961,546  6/1976  Gilmore et al. .......................... 74/866
4,281,567  8/1981  Maurer .................................. 74/866
4,294,341 10/1981  Swart ..................................... 74/866
4,393,732  7/1983  Suzuki et al. ........................... 74/866
4,495,457  1/1985  Stahl .................................. 364/424.1
4,535,412  8/1985  Cederquist ......................... 364/424.1
4,561,055 12/1985  Mckee ............................... 364/424.1

Primary Examiner—Parshotam S. Lall
Attorney, Agent, or Firm—Staas & Halsey

[57] ABSTRACT

Herein disclosed is a revolution signal processing system for an electronic controller to ensure safe operation of a vehicle having an automatic transmission. The system includes: an input shaft revolution sensor for outputting an input shaft r.p.m. signal; a vehicle speed sensor for outputting a vehicle speed signal; signal processors for determining the r.p.m.'s of the two sensors in response to the two output signals of the same; a gear position sensor for outputting a gear position signal; a gear position detector for detecting the gear position of the automatic transmission; and a self-testing backup. When the gear position detector detects that the transmission is in a gear position other than the neutral position, and if one of the output signals of the two sensors exhibits an r.p.m. equal to or higher than a predetermined value, whereas the other of the same exhibits an abnormally lower value or an r.p.m. lower than the predetermined value, then the self-testing back up determines that the sensor having the output signal exhibiting the abnormally low value is malfunctioning. Thus, the revolution signal processing system self-tests and backs up the vehicle speed sensor and the input shaft revolution sensor.

5 Claims, 4 Drawing Figures

REVOLUTION SIGNAL PROCESSING SYSTEM FOR VEHICULAR ELECTRONIC CONTROLLER

BACKGROUND OF THE INVENTION

1. Field of the Invention

The present invention relates to an electronic control of the operation run of a vehicle and, more particularly, to a revolution signal processing system of the self-testing, backup-type for self-testing revolution signals of the electronic controller and for backing up the same during malfunctions.

2. Description of the Prior Art

When a vehicle, such as an automobile, is to have its gear position changed automatically, this shifting operation is effected wholly electrically in the prior art, when an electronic signal processing system is used. By turning on or off one or more switches, therefore, it is feasible to set several speed changing patterns for effecting economical operation, sporty performance and so on. Since detections of signals and computations of speed changing points are usually accurate, moreover, dispersion of the gear shifting points is reduced to shorten delay in the timing for the speed change. Thanks to its independence, moreover, the electronic controller has an advantage that it can be maintained easily without any restriction from other controllers. Thus, the automatic transmission using the electronic controller of the above-specified type has a tendency to be more widely used each year.

Although this automatic transmission has the various advantages, its self-test and backup capabilities are problems. Specifically, when the gear position is to be determined by using signals which are outputted from a vehicle speed sensor and an input shaft revolution sensor, the vehicle speed exhibits a value of zero despite the vehicle running, if the vehicle speed sensor or the input shaft revolution sensor is malfunctioning, e.g. it is broken or has its circuit shorted or disconnected. With the vehicle speed at zero, the automatic gear shift does not perform. If the circuit is broken during high-speed operation, on the other hand, the gear is shifted down to a first speed, resulting in the danger that the engine may over run.

SUMMARY OF THE INVENTION

It is, therefore, an object of the present invention to provide a revolution signal processing system for an electronic controller to ensure safe operation of a vehicle having an automatic gear transmission.

Another object of the present invention is to provide a revolution signal processing system of the above type, which enables self-test of and backup for a vehicle speed sensor and an input shaft revolution sensor, if malfunctioning, so that the gear position of the transmission is proper for operation of the vehicle, even if the vehicle speed sensor and/or the input shaft revolution sensor are malfunctioning.

In order to self-test and backup the vehicle speed sensor and the input shaft revolution sensor, the revolution signal processing system according to the present invention comprises: signal processors for determining the revolutions per minute (r.p.m.'s) of the two sensors in response to the outputs of the same; a gear position sensor for outputting a gear position signal; a gear position detector for detecting the gear position of the automatic transmission; and a self-testing backup. When the gear position detector detects that the transmission is in a gear position other than the neutral position, and if one of the output signals of the input shaft revolution sensor and the vehicle speed sensor exhibits an r.p.m. equal to or higher than a predetermined value, whereas the other of the same exhibits an abnormally lower value or an r.p.m. lower than the predetermined value, then the self-testing backup judges that the sensor having the output signal exhibiting the abnormally low value is malfunctioning.

According to a preferred embodiment of the present invention, there is provided a revolution signal processing system for an electronic controller to ensure safe operation of a vehicle, comprising: an input shaft revolution sensor for outputting an input shaft r.p.m. signal indicating the r.p.m. of the input shaft of a transmission; a vehicle speed sensor for outputting a vehicle speed signal indicating the operating speed of a vehicle in terms of the r.p.m. of the output shaft of said trasmission; signal processing means for processing said input shaft r.p.m. signal and said vehicle speed signal to determine the r.p.m. of the input shaft and the r.p.m. of the output shaft of said transmission; a gear position sensor for outputting a gear position signal indicating the gear position of said transmission; gear position detecting means made responsive to the gear position signal of said gear position sensor for detecting the gear position of said transmission; and self-testing backup means made responsive to the r.p.m. of said input shaft and the r.p.m. of said output shaft determined by said signal processing means, and to the gear position of said transmission detected by said gear position detecting means. The self-testing, backup means deterines whether one of said input shaft revolution sensor and said vehicle speed sensor is malfunctioning, when the r.p.m. corresponding to one of the input shaft revolution signal of said input shaft revolution sensor and the vehicle speed signal of said vehicle speed sensor exhibits an abnormally low value, whereas the r.p.m. corresponding to the other exhibits a value equal to or higher than a predetermined value, if the gear position of said transmission detected by said gear position detecting means is other than a neutral position, thereby outputting a speed change signal to said transmission so that the gear position of said transmission is proper for the operating state of said vehicle even if said one of said input shaft revolution sensor and said vehicle speed sensor is malfunctioning.

BRIEF DESCRIPTION OF THE DRAWINGS

Other objects, features and advantages of the present invention will become apparent from the following description taken in connection with the embodiments thereof with reference to the accompanying drawings, in which.

DETAILED DESCRIPTION OF THE PREFERRED EMBODIMENTS

Figure 1:
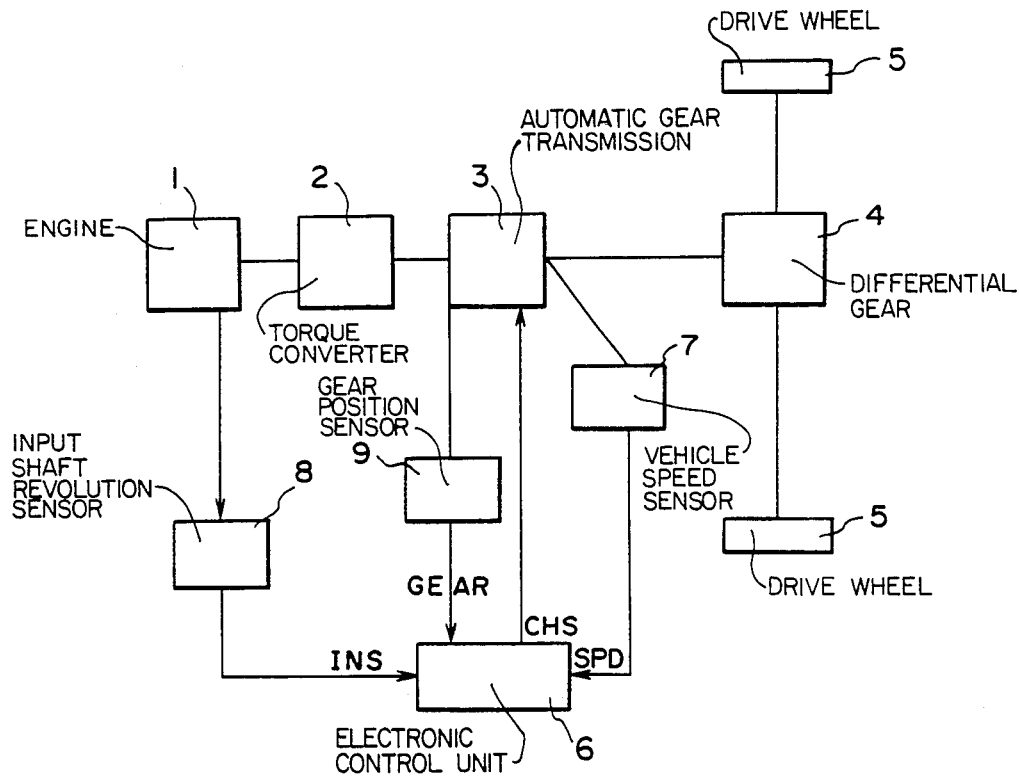
FIG. 1 is a diagrammatic view showing a revolution signal processing system for use with an electronic controller of an automotive automatic transmission according to the present invention.
Figure 2:
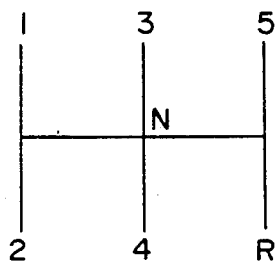
FIG. 2 is a schematic view showing the gear positions of the automatic transmission of FIG. 1.

As shown in FIG. 1, an input shaft revolution sensor 8 detects the number of revolutions per minute of an engine 1 to output an input shaft revolution signal INS to an input terminal of an electronic control unit 6. On the other hand, a vehicle speed sensor 7 detects the r.p.m. of the output shaft of an automatic gear transmission 3, which is transmitted from the engine 1 through a torque converter 2, i.e., the running speed of the automobile to output a vehicle speed signal SPD to another input terminal of the electronic control unit 6. In response to those signals INS and SPD, the electronic control unit 6 computes to output a speed change signal CHS dictating which speed position, as shown in FIG. 2, the gear transmission 3 is to be shifted to, so that the transmission 3 has its shift valves actuated selectively to change the gear to the dictated position. The drive power thus shifted is transmitted through a differential gear 4 to a pair of drive wheels 5. The construction thus far described is not different from that of the prior art.

The difference of the present invention from the prior art resides in the following point. In order to self-test and backup the vehicle speed sensor 7 and the input shaft revolution sensor 8 connected with the electronic control unit 6, there is added to this unit 6 a self-testing, backup means which is made responsive to the output signal of a gear position sensor 9, i.e., a gear position signal GEAR for detecting the gear position of the transmission 3 to process the revolution signals of the electronic control unit 6 in association with the signals of those sensors 8 and 9 and with the computation of a microcomputer.

Figure 3:
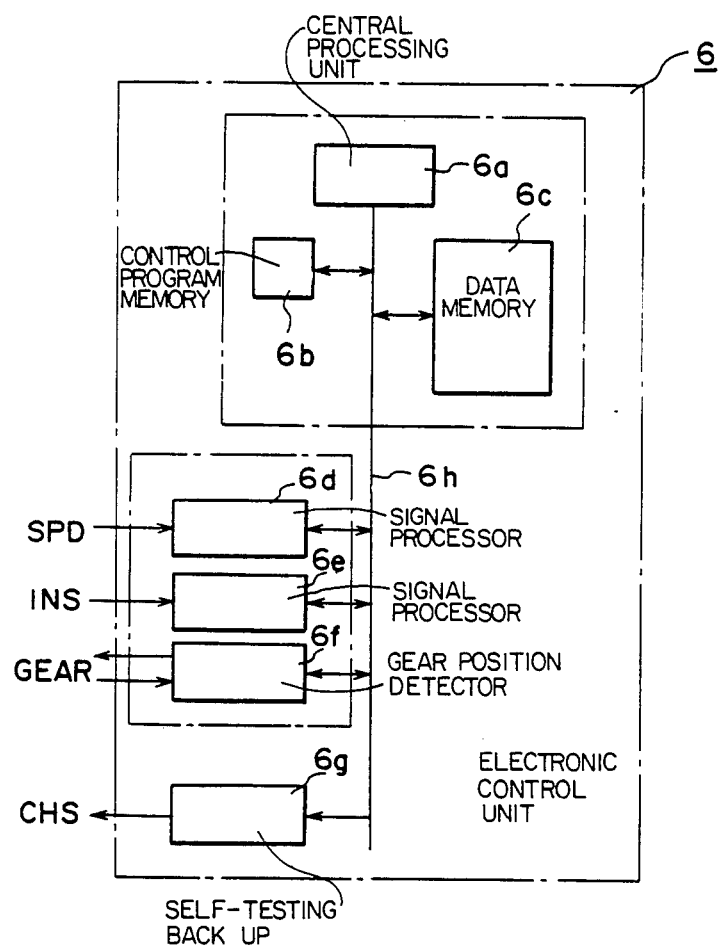
FIG. 3 is a diagrammatic view showing an electronic control unit for use with the revolution signal processing system of FIG. 1 in more detail.
Figure 4:
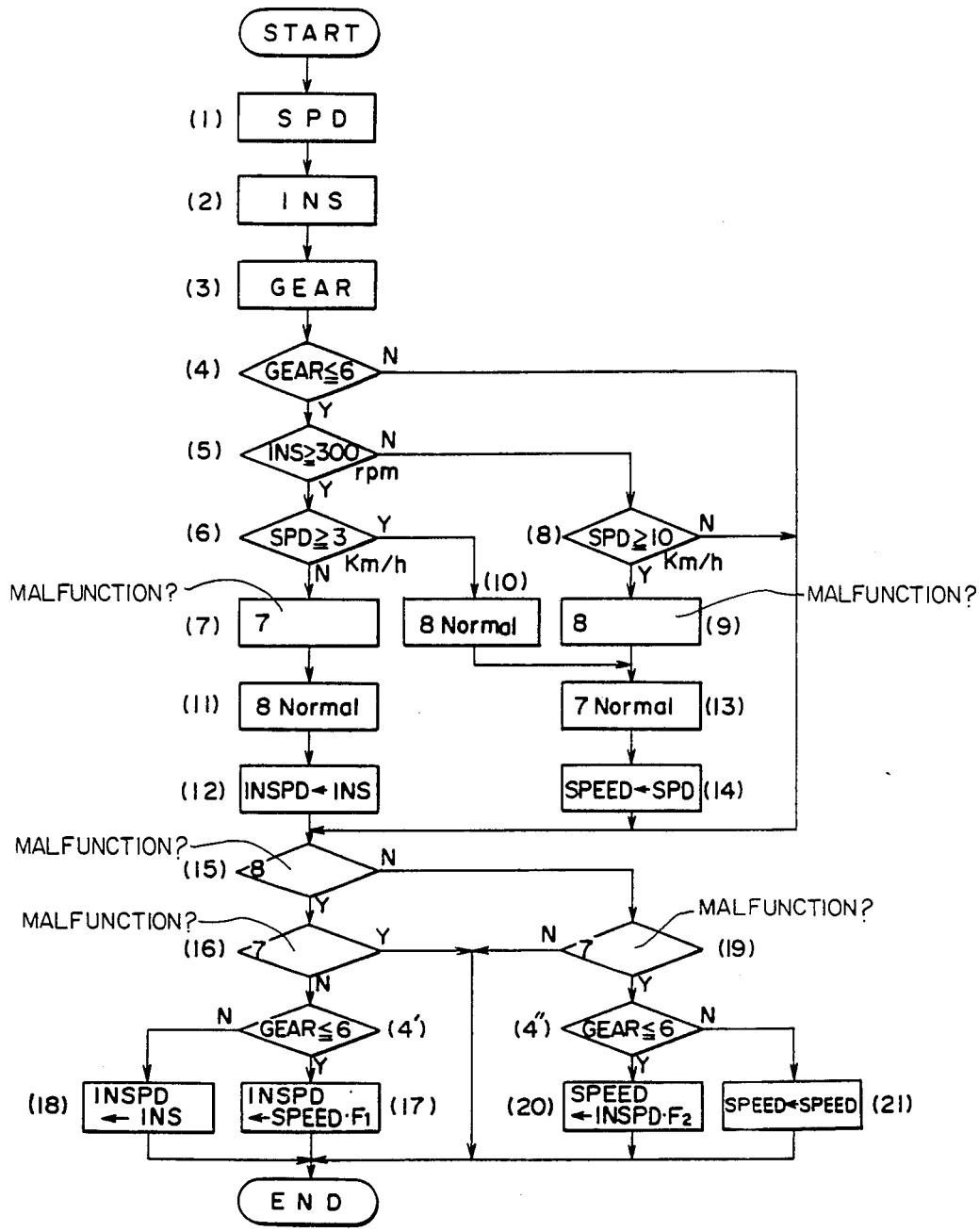
FIG. 4 is a flow chart for explaining the operation of the revolution signal processing system shown in FIGS. 1 and 3.

The construction of the electronic control unit 6 will be described in detail in the following with reference to FIG. 3 as well as FIG. 4. When the vehicle speed sensor SPD is inputted from the vehicle speed sensor 7 (as at a step (1)), as has been described with reference to FIG. 1, a signal processor 6d determines the r.p.m. of the output shaft of the gear transmission 3 to output in a digital form. When the input shaft revolution signal INS is inputted from the input shaft revolution sensor 8 (as at a step (2)), moreover, another signal processor 6e determines the r.p.m. of the input shaft of the gear transmission 3 to output it in a digital form. When the gear position signal GEAR is inputted from the gear position sensor 9 (as at a step (3)), a gear position detector 6f detects the gear position to output it in a digital form. Incidentally, this gear position detector 6f has already been proposed, as is disclosed in Japanese Patent Laid-Open No. 57-20972.

Here, the positions of the (not-shown) shift lever of the automobile is shown by way of an example in FIG. 2, and the gear positions themselves are enumerated in the following Table.

TABLE

| GEAR | Gear Positions |
|---|---|
| 1 | 1st Speed |
| 2 | 2nd Speed |
| 3 | 3rd Speed |
| 4 | 4th Speed |
| 5 | 5th Speed |
| 6 | Reverse |
| 8 | Neutral |

In view of this Table, the signals GEARs "1", "2", "3", "4", "5", "6" and "8" indicate the 1st-speed position, the 2nd-speed position, the 3rd-speed position, the 4th-speed position, the 5th-speed position, the reverse position, and the neutral position, respectively. In response to these signals, the aforementioned self-testing backup 6g self-tests and backs up the vehicle speed sensor 7 and the input shaft revolution sensor 8 to process the revolution signals when these sensors 7 and 8 are malfunctioning. These revolution signal processings will be described in more detail with reference to FIG. 4.

First of all, the case, where it is judged that the vehicle speed sensor 7 is malfunctioning, will be described in the following. When it is detected: that a relation of GEAR≦6 by the gear position detector 6f (as at a step (4)); that the transmission 3 is in a gear position other than the neutral position; (as at a step (5)) that the input shaft revolution signal INS is equal to or higher than 300 r.p.m., for example; (as at a step (6)) that the vehicle speed signal SPD is lower than 3 Km/h, for example, then it is judged (as at a step (7)) that the vehicle speed sensor 7 is malfunctioning.

Next, the case in which the input shaft revolution sensor 8 is malfunctioning is described. When it is also detected: that the relation of GEAR≦6 by the gear position detector 6f (at the step (4)); that the transmission 3 is in a gear position other than the neutral position; (at the step (5)) that the input shaft revolution signal INS is lower than 300 r.p.m.; and (as at a step (8)) that the vehicle speed signal SPD is equal to or higher than 10 Km/h, for example, it is judged (as at a step (9)) that the input shaft revolution sensor 8 is malfunctioning.

More specifically, when the gear position detector 6f detects that the transmission 3 is in a gear position other than the neutral position and if one of the output signals INS and SPD of the input shaft revolution sensor 8 and the vehicle speed sensor 7 exhibits an r.p.m. equal to or higher than a predetermined value, whereas the other of the same exhibits an abnormally lower value or an r.p.m. lower than the predetermined value, then it is judged that the sensor 7 or 8 having the output signal exhibiting the abnormally low value is malfunctioning.

On the other hand, when it is detected: (at the step (4)) that the transmission 3 is in other than the neutral position; and (at the step (5)) that the input shaft revolution signal INS is equal to or higher than 300 r.p.m., but (at the step (6)) that the vehicle speed signal SPD is also equal to or higher than 3 Km/h, then it is judged (as at a step (10)) that the input shaft revolution sensor 8 is operating normally.

Moreover, when it is judged: (at the step (7)) that the vehicle speed sensor 7 is malfunctioning and (as at a step (11)) that the input shaft revolution sensor 8 is normal, then it is judged (as at a step (12)) that the input shaft revolution signal INS sets the r.p.m. of the input shaft INSPD. On the other hand, when it is judged (at the step (9)) that the input shaft revolution sensor 8 is malfunctioning, but (as at a step (13)) that the vehicle speed sensor 7 is normal, then it is judged (as at a step (14)) that the vehicle speed signal SPD sets the r.p.m. of the output shaft SPEED. On the contrary, when it is judged (at the step (10)) that the input shaft revolution sensor 8 is normal, and (at the step (13)) that the vehicle speed sensor 7 is also normal, then it is likewise judged (at the step (14)) that the vehicle speed signal SPD sets the output shaft r.p.m. speed.

When it is judged (at the step (12) or (14)), i.e., it is detected from a relation of GEAR>6 (at the step (4)) that the gear is in the neutral position or (at the step (8))

that the vehicle speed signal SPD is lower than 10 Km/h, the following judgements will be further conducted.

Specifically, when it is judged (as at steps (15) and (16)) that the input shaft revolution sensor 8 is malfunctioning, whereas the vehicle speed sensor 7 is normal, respectively, it is judged (as at a step (17)) that the input shaft r.p.m. INSPD is set at the product of the output shaft r.p.m. SPEED based upon the vehicle speed signal SPD and a gear ratio $F_1$, if it is detected from the relation of GEAR≦6 (as at a step (4')) that the gear position is not neutral, and it is judged (as at a step (18)) that the input shaft r.p.m. INSPD is set at 0(=INS), if it is detected from the relation of GEAR>6 that the gear position is neutral. On the contrary, when it is judged (at the step (15) and as at a step (19)) that the input shaft revolution sensor is normal, whereas the vehicle speed sensor 7 is malfunctioning, it is judged (as at a step (20)) that the output shaft r.p.m. SPEED is set at the product of the input shaft r.p.m. INSPD and a reciprocal number $F_2$ of the gear ratio $F_1$, if it is detected from the relation of GEAR≦6 (as at a step (4")) that the gear position is not neutral, and it is judged (as at a step (21)) that the output shaft r.p.m. SPEED is set continuously at the output shaft r.p.m. SPEED, which has been used immediately before the neutral position, if it is detected from the relation of GEAR>6 that the gear position is neutral. Incidentally, the output shaft r.p.m. SPEED, the gear ratio $F_1$ and its reciprocal number $F_2$ are expected by the following equations:

$$SPEED = 2\pi\gamma \times (INSPD/im \times if) (60/1,000);$$

$$F_1 = (1,000 \times if/120\pi\gamma \times im(GEAR));\ and$$

$$F_2 = (120\pi\gamma/1,000 \times if) \times (1/im(GEAR)).$$

wherein: letter $\pi$ designates the circle ratio; letter $\gamma$ designates the radius of the tires of the drive wheels 5; letters "im" designate the gear ratio (i.e., a constant intrinsic to each GEAR); and letters "if" designate the final gear ratio.

Thus, the self-testing backup 6g exchanges data through a bus 6h with a CPU 6a, a control program memory 6b, and a data memory 6c of the electronic control unit 6 to output the speed change signal CHS for controlling the gear transmission 3. More specifically, the data memory 6c is stored with the critical values of the digital gear position signal GEAR of the gear position detector 6f, the digital input shaft r.p.m. signal INS of the signal processor 6e, and the digital vehicle speed signal SPD of the signal processor 6d for providing the data to detect the gear position of the transmission 3 and to judge the malfunctioning of the input shaft revolution sensor 8 and the vehicle speed sensor 7, respectively. The control program memory 6b is stored with a control program. Thus, the central processing unit 6a acting as the microcomputer controls the self-testing backup 6g, the gear position detector 6f and the signal processors 6d and 6e in accordance with the critical values of the data memory 6c and the control program of the control program memory 6b.

Incidentally, the running speed of the vehicle can be detected not only in terms of the r.p.m. of the output shaft of the transmission, as has been explained hereinbefore, but also in terms of the r.p.m. of a suitable portion of the power train leading from the output shaft to the drive wheel or wheels.

As has been described hereinbefore, according to the present invention, the self-test and backup can be realized with the simplified construction when the vehicle speed sensor or the input shaft revolution sensor, both indispensible for the automatic speed change, are malfunctioning. This makes it possible to improve safety and reliability in the operation of a car with an automatic transmission.

What is claimed is:

1. A revolution signal processing system for an electronic controller to ensure safe operation of a vehicle, comprising:

(a) a first sensor for detecting and outputting a signal indicating the r.p.m. of the input shaft of a transmission;

(b) a second sensor for detecting and outputting a signal indicating the r.p.m. of the output shaft of the transmission;

(c) first means for processing said input shaft r.p.m. signal and said output shaft r.p.m. signal to determine the r.p.m. of the input shaft of said transmission and a speed of the vehicle;

(d) a third sensor for detecting and outputting a signal indicating the gear position of said transmission;

(e) second means, responsive to the gear position signal, for detecting the gear position of said transmission;

(f) third means for judging that said first sensor is malfunctioning when the r.p.m. of said input shaft exhibits a value lower than a first predetermined value and the speed of the vehicle exhibits a value equal to or higher than a second predetermined value, when the gear position of said transmission detected by said second means is other than in a neutral position; and (g) fourth means for judging that said second sensor is malfunctioning when the speed of said vehicle exhibits a value lower than the second predetermined value and the r.p.m. of said input shaft exhibits a value equal to or higher than the first predetermined value, when the gear position of said transmission detected by said second means is other than in a neutral position.

2. A revolution signal processing system according to claim 1, further comprising:

(h) a data memory stored with critical values of said gear position signal, said input shaft r.p.m. signal and said vehicle speed signal for providing data to detect the gear position of said transmission and to judge when said first sensor and said second sensor are malfunctioning, respectively;

(i) a memory stored with a control program; and (j) a central processing unit for controlling said first, second, third, and fourth means in accordance with the critical values of said data memory and the control program memory.

3. A revolution signal processing system according to claim 2, wherein said first means includes (i) a first signal processor for processing said input shaft r.p.m. signal and outputting said input shaft r.p.m. signal in a digital form, and (ii) a second signal processor for processing said output shaft r.p.m. and outputting said vehicle speed signal in a digital form, and wherein said second means includes (i) a detector for outputting said gear position signal in a digital form.

4. A revolution signal processing system according to claim 1, wherein said third means sets, when said first sensor is determined to be malfunctioning, the r.p.m. of said input shaft at a product of the r.p.m. of said output shaft outputted by said second sensor and a gear ratio, if the gear position detected is other than said neutral position, and at zero, if the gear position detected is said neutral position.

5. A revolution processing system according to claim 1, wherein said fourth means sets, when said second sensor is determined to be malfunctioning, the r.p.m. of said output shaft at a product of the r.p.m. of said input shaft outputted by the first sensor and a reciprocal number of a gear ratio, if the gear position detected is other than said neutral position, and continuously at such an r.p.m. of said output shaft outputted from said second sensor, if the gear position detected is said neutral position, as has been used immediately before said neutral position.

* * * * *